US008294408B2

(12) United States Patent
Matt et al.

(10) Patent No.: US 8,294,408 B2
(45) Date of Patent: Oct. 23, 2012

(54) POWER SUPPLY WITH TWO SERIES INVERTERS FOR A POLYPHASE ELECTROMECHANICAL ACTUATOR

(75) Inventors: Daniel Matt, Castelnau (FR); Julien Jac, Montpellier (FR); Nicolas Ziegler, Montpellier (FR)

(73) Assignee: Messier-Bugatti Dowty, Velizy Villacoublay (FR)

( * ) Notice: Subject to any disclaimer, the term of this patent is extended or adjusted under 35 U.S.C. 154(b) by 495 days.

(21) Appl. No.: 12/519,065

(22) PCT Filed: Dec. 7, 2007

(86) PCT No.: PCT/FR2007/002013
§ 371 (c)(1),
(2), (4) Date: Dec. 1, 2009

(87) PCT Pub. No.: WO2008/087270
PCT Pub. Date: Jul. 24, 2008

(65) Prior Publication Data
US 2010/0141189 A1   Jun. 10, 2010

(30) Foreign Application Priority Data
Dec. 13, 2006   (FR) ...................... 06 10862

(51) Int. Cl.
*H02P 1/24*   (2006.01)
(52) U.S. Cl. .......................... 318/727; 363/42
(58) Field of Classification Search ............... 318/727, 318/801, 812; 363/42, 43
See application file for complete search history.

(56) References Cited

U.S. PATENT DOCUMENTS

| 5,729,096 A * | 3/1998 | Liu et al. ................. 315/225 |
| 6,178,103 B1 * | 1/2001 | Deng et al. ................. 363/71 |
| 2008/0258661 A1 * | 10/2008 | Nagashima et al. ..... 318/400.29 |
| 2008/0303349 A1 * | 12/2008 | Gallegos-Lopez et al. ..... 307/75 |
| 2009/0026895 A1 * | 1/2009 | Chakrabarti et al. ....... 310/68 D |

FOREIGN PATENT DOCUMENTS

| DE | 4439932 | 5/1995 |
| FR | 2865868 | 8/2005 |

OTHER PUBLICATIONS

Wallmark O et al: "Post-Fault Operation of Fault-Tolerant Inventors for PMSM Drives"; Power electronics and applications, 2005 European Conference on Dresden Germany Sep. 11-14, 2005, Piscataway, NJ, USA, IEEE, Sep. 11, 2005, pp. P1-P11, XP010933274—IBSN: 90-75815-09-5.

\* cited by examiner

*Primary Examiner* — Rina Duda
(74) *Attorney, Agent, or Firm* — Sughrue Mion, PLLC

(57) ABSTRACT

The invention relates to a power supply having two inverters (A, B) in series for powering an electromechanical actuator having an electric motor including a plurality of windings (R1, R2, R3) forming phases, each inverter being connected to its own ground (50; 51) and having a voltage source (U1; U2) having as many arms (A1, A2, A3; B1, B2, B3) as there are windings to be powered, each arm including two controlled switches (5, 6) connected in series, with a point therebetween being provided for connection to one end of one of the windings. According to the invention, each inverter includes an additional arm (A4; B4) having two controlled switches, the two additional arms being interconnected by a bridge (7) that is connected to each of the additional arms at a point that is situated between the switches.

2 Claims, 3 Drawing Sheets

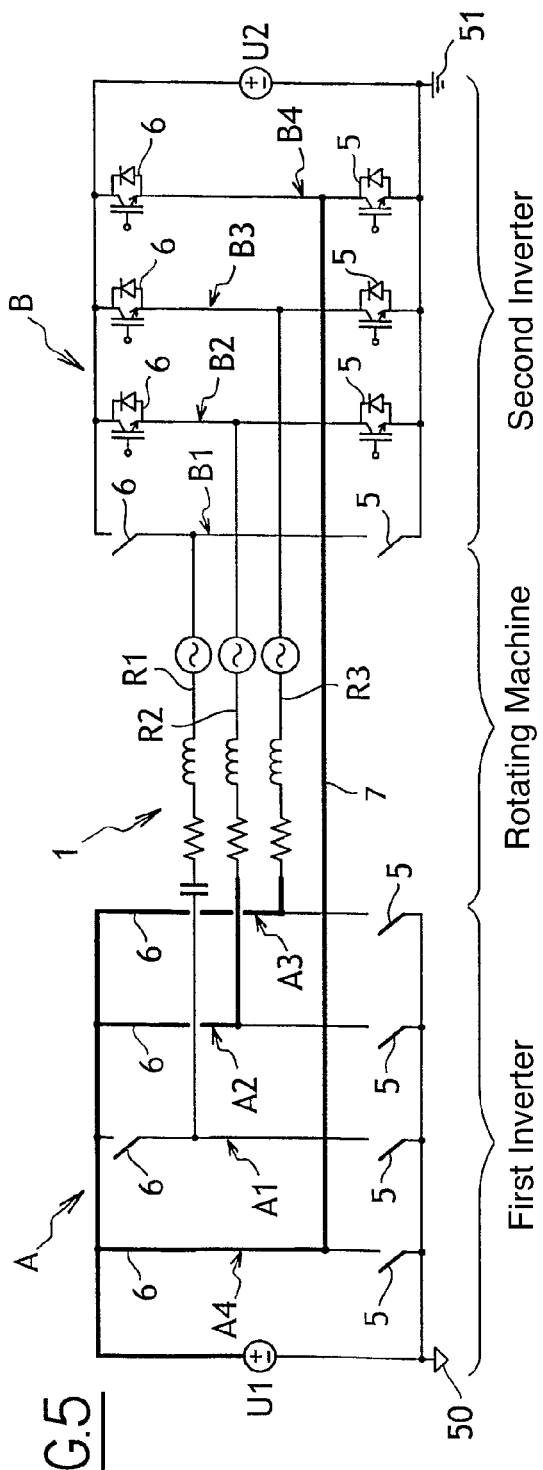
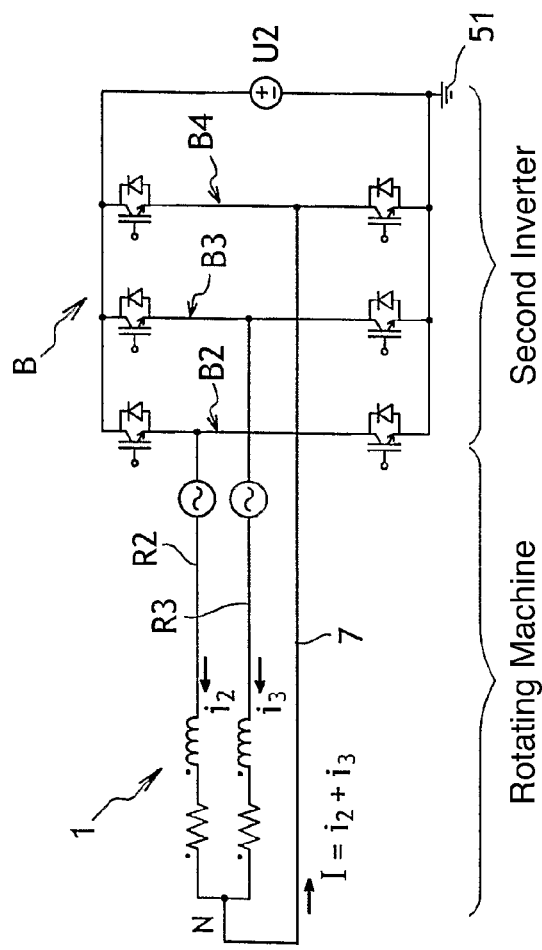
FIG.5
FIG.6

POWER SUPPLY WITH TWO SERIES INVERTERS FOR A POLYPHASE ELECTROMECHANICAL ACTUATOR

CROSS-REFERENCE TO RELATED APPLICATIONS

This application is entitled to the benefit of and incorporates by reference essential subject matter disclosed in International Application No. PCT/FR2007/002013 filed on Dec. 7, 2007 and French Patent Application No. 06 10862 filed on Dec. 13, 2006.

FIELD OF THE INVENTION

The invention relates to a power supply having two inverters in series for a polyphase electromechanical actuator.

BACKGROUND OF THE INVENTION

In order to power an electromechanical actuator having a polyphase motor including windings that form phases, it is known to use power supplies comprising two inverters connected in series. Each inverter has a voltage source with its terminals connected to as many arms as there are windings for powering on the machine. Each arm comprises an upstream controlled switch and a downstream controlled switch connected in series. Each winding has a first end connected to one of the arms of one of the inverters, at a point that is situated between the controlled switches of said arm, and a second end connected to one of the arms of the other inverter, likewise at a point situated between the controlled switches of said arm.

If one of the controlled switches in one of the arms of one of the inverters fails, so as to remain permanently open or closed, it is known to close certain switches of the inverter in question and to open its other switches so as to create a common point between the ends of the windings connected to said inverter, which common point is connected to one of the terminals of the voltage source. Since the two voltage sources are connected to grounds that are distinct, the common point is neutral from the point of view of the other inverter, and it therefore becomes possible to control the machine solely from the other inverter, thereby continuing to ensure operation of the rotary machine with torque that is substantially constant.

Such an architecture is thus capable of withstanding the failure of one of the controlled switches. Nevertheless, such an architecture does not make it possible to continue operating the rotary machine correctly if the end of one of the windings becomes disconnected from the corresponding arm. For example, on a three-phase rotary machine having one of its windings disconnected, there still remain two phases that can be controlled. If the switches of the inverters continue to be controlled as though one of the windings had not become disconnected, then the machine would be subjected to torque with a high degree of ripple, which can be very harmful in certain applications, for example actuating high-lift devices of an aircraft, or actuating landing gear.

As described above, it is possible to seek to create a common point between the two good phases by opening and closing the switches one of the inverters appropriately. Nevertheless, the two phases as interconnected in this way via a common point can be controlled only by using currents that present a sum that is zero, which currents therefore need to be phase offset at an angle $\pi$, which, in combination with the phases being spatially offset by $2\pi/3$, likewise leads to torque with a high level of ripple.

OBJECT OF THE INVENTION

An object of the invention is to improve power supply from two inverters in series in a manner that makes it possible to continue operating the actuator acceptably in the event of one of the switches failing, and also under other fault circumstances.

BRIEF SUMMARY OF THE INVENTION

To achieve this object, the invention provides a power supply having two inverters in series for powering an electromechanical actuator having an electric motor including a plurality of windings forming phases, each inverter being connected to its own ground and having a voltage source having as many arms connected thereacross as there are windings to be powered, each arm including two controlled switches connected in series, with a point therebetween being provided for connection to one end of one of the windings. According to the invention, each inverter includes an additional arm having two controlled switches, the two additional arms being interconnected by a bridge that is connected to each of the additional arms at a point that is situated between the switches.

Thus, under normal circumstances, the controlled switches of the additional arms are kept open so that the additional arms and the bridge have no incidence on the operation of the actuator. The power supply can be reconfigured to handle the failure of a switch in the conventional manner.

If one of the windings becomes disconnected from one of the arms, such that the corresponding phase can no longer be controlled, it is possible to power the good phases with currents presenting a sum that is not constantly zero so as to enable the motor to turn with constant torque. The residual current coming from the non-zero sum of the currents in the good phases is drained via the bridge so as to be returned to the inverter that is generating such currents. The presence of the bridge and of the additional arms thus enables the actuator to be operated at constant torque.

In particular, with a three-phase motor having one of its phases disconnected, it is possible by suitably controlling the switches to create a common point between the two good phases and the bridge, thereby enabling the actuator to operate at constant torque in a two-phase mode: by providing power supply currents that are phase-shifted by $\pi/3$, while the phases are themselves spatially phase offset by an angle equal to $2\pi/3$, constant torque is obtained. This enables operation to continue at constant torque, even in the event of one of the phases being disconnected.

BRIEF DESCRIPTION OF THE DRAWINGS

The invention can be better understood in the light of the following description given with reference to the figures of the accompanying drawings, in which:

FIG. 5 is a view analogous to FIG. 4 showing a second manner of managing a disconnected phase; and FIG. 6 is a diagram equivalent to that of FIG. 5, but showing only the arms that are functional.

DETAILED DESCRIPTION OF THE INVENTION

Figure 1:
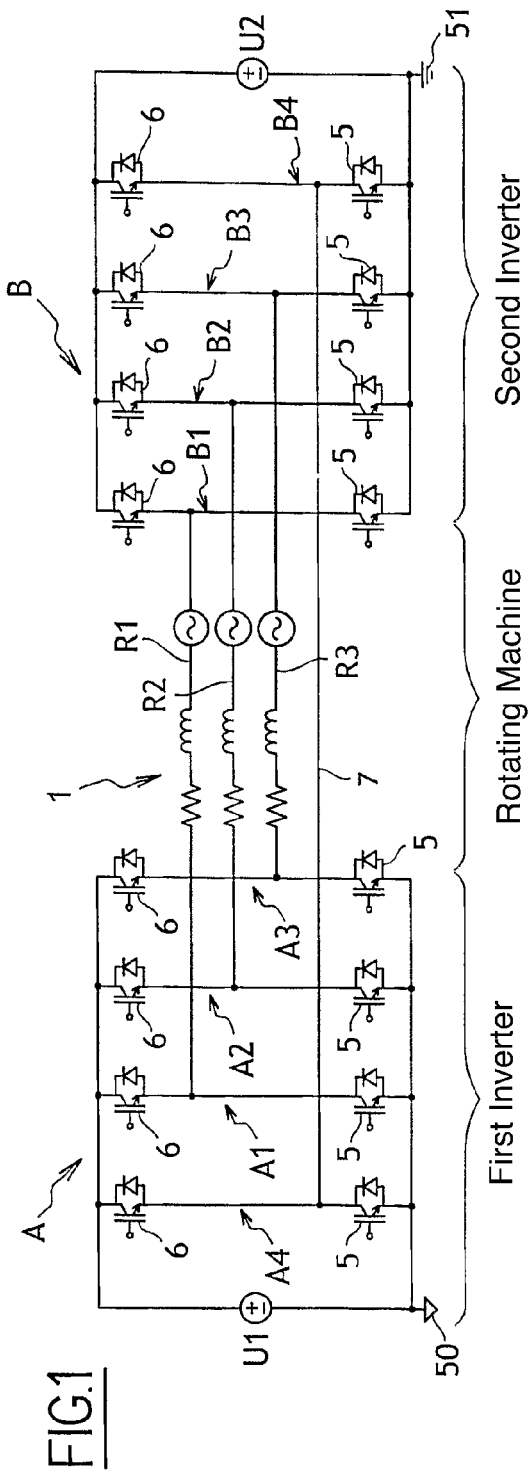
FIG. 1 is a diagrammatic view of a power supply with two inverters in series for an actuator that is fitted with a three-phase electric motor, and constituting a particular embodiment of the invention.

With reference to FIG. 1, the power supply architecture is shown here in application to an electromechanical actuator provided with a three-phase electric motor or rotary machine 1, represented by three windings R1, R2, and R3, each symbolized conventionally as a resistor, an inductor, and a back electromotive force (back e.m.f.) connected in series. Each of the windings forms one of the phases of the rotary machine, and each is offset spatially by $2\pi/3$ relative to other windings. The power supply of the invention shown here comprises a first converter or inverter A and a second converter or inverter B.

The inverter A comprises a first voltage source U1 having one of its terminals connected to a first ground 50. Across the terminals of the first voltage source U1, there extend three arms A1, A2, and A3, each comprising an upstream controlled switch 5 and a downstream controlled switch 6 that are connected in series along the arm. By way of example, the controlled switches 5 and 6 forming parts of the inverters A and B are constituted by bipolar junction transistors, by metal oxide semiconductor field effect transistors (MOSFETs), by gate turn-off thyristors, or indeed by isolated grid transistors.

Each winding R1, R2, or R3 has a first end connected of the corresponding arm A1, A2, or A3 at a point situated between the corresponding controlled switches 5 and 6.

Similarly, the inverter B has a second voltage source U2 with one terminal connected to a second ground 51 that is independent of the first ground 50. The terminals of the second voltage source U2 have three arms B1, B2, and B3 connected thereto, each arm having an upstream controlled switch 5 and a downstream controlled switch 6 connected in series in the arm.

Each winding R1, R2, and R3 has a respective second end connected to the respective arm B1, B2, or B3 at a point situated between the corresponding controlled switches 5 and 6.

Thus, each of the windings R1, R2, and R3 is connected in series with one of the arms of the first inverter A and with one of the arms of the second inverter B. In known manner, the switches 5 and 6 are controlled so as to cause currents that are phase offset by $2\pi/3$ to flow through the windings R1, R2, and R3 (the sum of the currents being constantly zero). The rotary machine is thus constrained to operate at constant torque. The machine may be controlled either with the help of the first inverter A, or with the help of the second inverter B, or with the help of both inverters operating simultaneously and synchronously.

This type of power supply can be found on board an aircraft that has two totally independent power supply circuits, with distinct grounds. Alternatively, and in known manner, it is possible to create a second power supply circuit from a first power supply circuit by means of an isolating transformer, or indeed an isolated switch mode power supply (SMPS).

According to the invention, the first inverter A also has an additional arm A4, entirely similar to the arms A1, A2, and A3. Similarly, the second inverter B has an additional arm B4, entirely similar to the arms B1, B2, and B3. The additional arms A4 and B4 are interconnected by a bridge 7 that is connected to each of the additional arms A4 and B4 at a respective point situated between its controlled switches 5 and 6. In normal operation, the controlled switches 5 and 6 of the additional arms A4 and B4 are kept open, such that neither the additional arms nor the bridge 7 disturbs the operation of the rotary machine.

In the following figures, there can be seen various fault modes and the ways in which they are handled. In these figures, switches that are blocked in a closed position or that are voluntarily held in a closed position are represented by an electrical connection. Switches that are blocked in an open position or that are voluntarily held in the open state are represented by a portion of open circuit.

Figure 2:
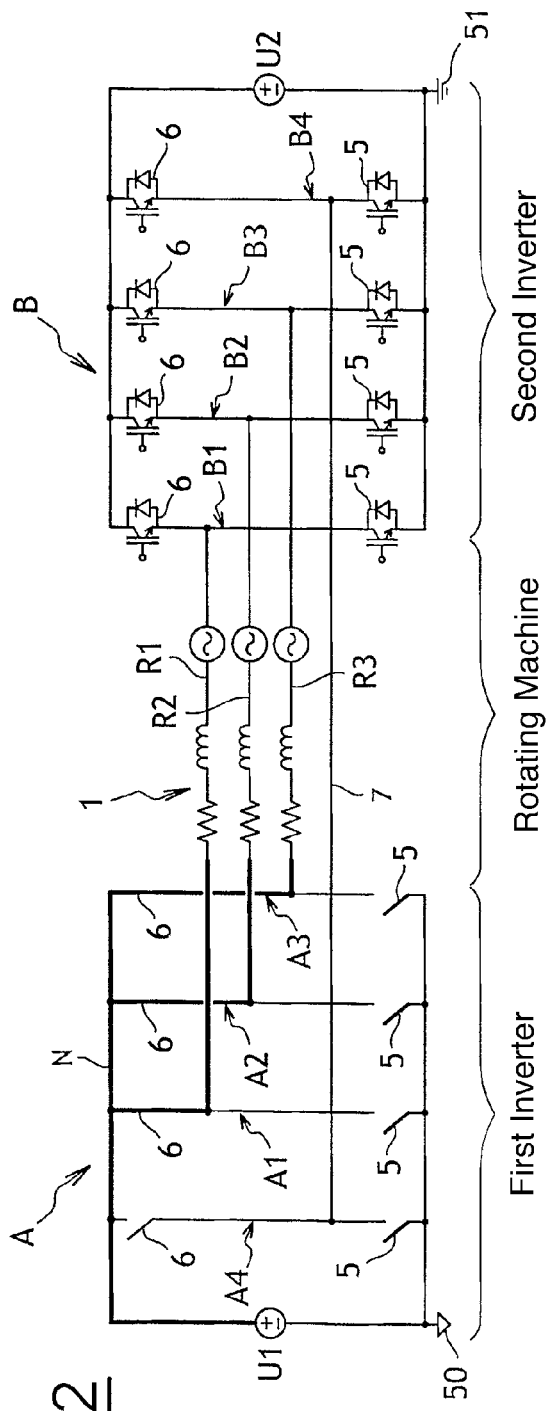
FIG. 2 is a view analogous to FIG. 1, illustrating a fault situation in which one of the switches is blocked in the closed position.

In a first fault mode, it can happen that one of the switches 5 or 6 of one of the arms A1, A2, or A3 of the first inverter A fails. For example, and as shown in FIG. 2, it is assumed that the downstream switch 6 in the arm A1 remains blocked in the closed position as the result of a failure.

Figure 3:
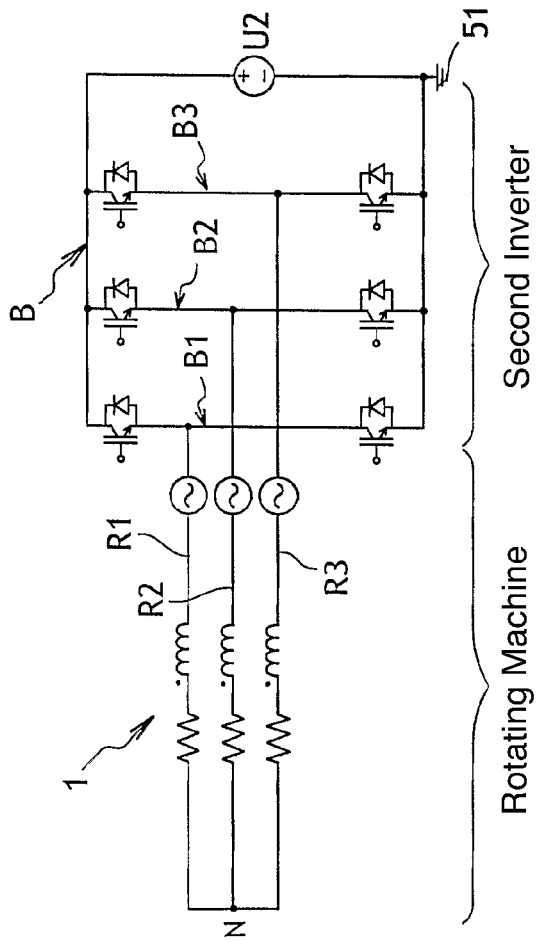
FIG. 3 is a diagram equivalent to that of FIG. 2, but showing only those arms that are functional.

Naturally, it might be thought that the corresponding phase could be neutralized by not powering it. However it is possible to consider using all three phases by applying the following method: it suffices to keep the downstream switches 6 of the arms A2 and A3 closed, and to open the upstream switches 5 of the arms A1, A2, and A3. This creates a common point N between the ends of the windings R1, R2, and R3 beside the inverter A. Connections passing via this common point N are drawn bold. Operation then takes place as though the power supply architecture were as shown in FIG. 3.

All three phases can then continue to be controlled by using the controlled switches 5 and 6 of the second inverter B to cause currents that are mutually phase offset by $2\pi/3$ to flow through the windings R1, R2, and R3. The first inverter A is completely neutralized, and can no longer influence the control of the rotary machine by the second inverter B. In particular, the potential of the common point N does indeed depend on the potential imposed by the voltage source U1, and cannot be imposed by the voltage source U2. From the point of view of the second inverter B, the common point N therefore has a potential that is floating. That makes it possible to power each of the phases with currents that are phase offset by $2\pi/3$ so that the sum of the currents is constantly zero. Combined with the spatial phase offset by $2\pi/3$, the torque from the rotary machine as powered in this way remains constant and equal to the nominal torque before the failure of a switch. Naturally, at constant voltage U2, the speed as generated in this way is halved. To return to the initial speed, it is necessary to increase the voltage U2 accordingly.

If one of the downstream switches 6 in one of the arms A1, A2, and A3 of the first inverter A were to be blocked in the open position, then it would suffice to keep the other downstream switches 6 in said arms open and to keep the upstream switches 5 of said arms closed. That would operate in the same manner to recreate a common point between the phases, so that the rotary machine remains perfectly under control.

The same remedies apply when one of the upstream switches 6 of the arms A1, A2, and A3 of the first inverter A remains blocked in the open position or in the closed position. In the same manner, the same remedies apply if one of the switches 5, 6 of the arms B1, B2, and B3 of the second inverter B remains blocked.

With the above faults, the switches of the additional arms A4 and B4 are kept open, such that the additional arms are not used for handling such faults.

Figure 4:
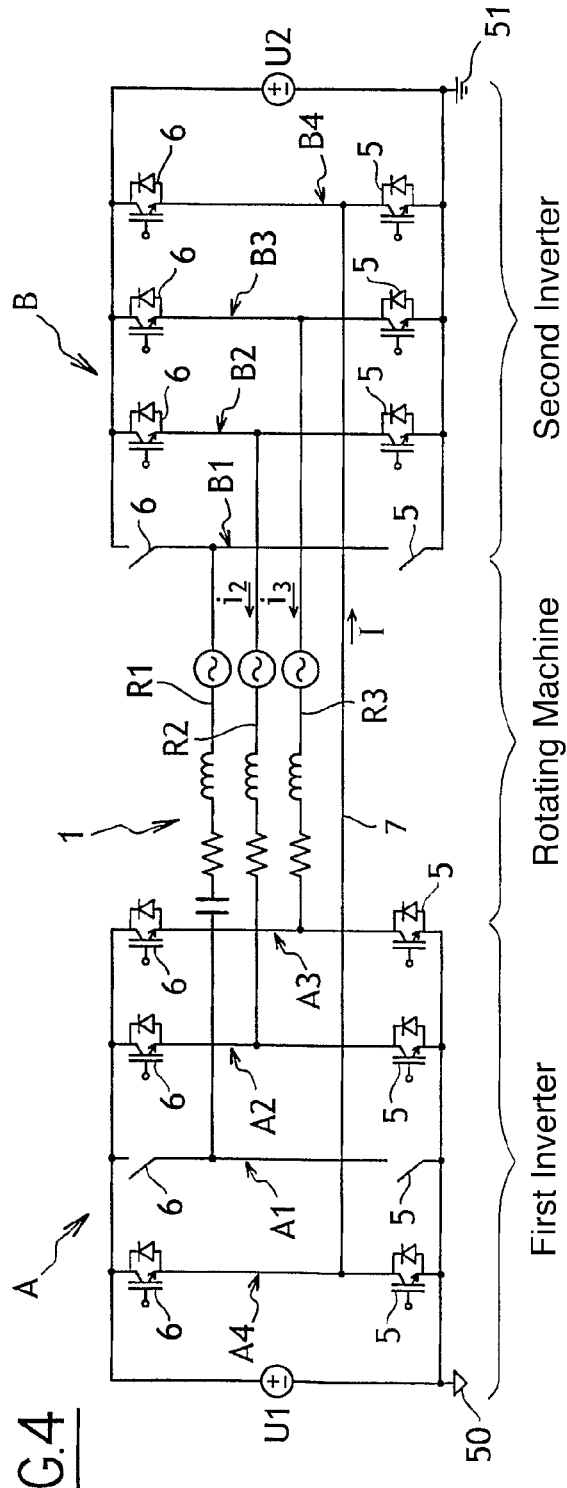
FIG. 4 is a view analogous to FIG. 1 showing a fault situation in which one of the motor windings is disconnected from one of the arms.

In another fault configuration, one of the windings may become disconnected from one of the arms. As can be seen in FIG. 4, it is assumed that the fault is one in which the winding R1 is disconnected from the arm A1 of the first inverter A, as is shown symbolically. It is then no longer possible to power the corresponding phase. The above strategies can therefore not be applied.

For reasons of safety, it is appropriate firstly to isolate the disconnected winding R1 by opening the switches 5 and 6 in the arms A1 and B1 that are associated with the winding so as to avoid any risk of a short circuit between the inverters via the faulty winding.

In a first strategy, the switches of the arms A2, A3, B2, and B3 and of the additional arms A4 and B4 are controlled so as to cause currents i2 and i3 to flow through the good windings R2 and R3, with the currents i2 and i3 being phase offset by $\pi/3$. Under such circumstances, the sum of the currents i2 and i3 is not constantly zero. Nevertheless, the current residue I=i2+i3 is collected by the bridge 7 and passes therethrough to return to the inverter that generated the currents i2 and i3. Such operation gives rise to torque that is constant. FIG. 4 shows the currents i2 and i3 powering the good phases (windings R2 and R3) and also the current I drained by the bridge 7. It can be shown that, when powered in this way, the rotary machine develops constant torque, but that the torque is equal to 57% of the torque that it would have been possible to develop if one of the windings were not disconnected.

If it is desired to recover nominal torque, it is then appropriate to increase the power supply current accordingly. In this mode of operation, the speed of rotation of the actuator is equal to the nominal speed of rotation.

In a second strategy shown in FIGS. 5 and 6, a common point N is created between the good phases and the bridge 7. For this purpose, the downstream switches 6 of the remaining arms A2 and A3 are kept closed, as is the downstream switch 6 of the additional arm A4. The upstream switches 5 of the arms A1, A2, and A3 and also the upstream switch 5 of the additional arm A4 are kept open. This creates a common point N between the ends of the windings R2 and R3, and the bridge 7. The first inverter A is thus neutralized.

As shown in FIG. 5, the bridge 7 and the two good windings R2 and R3 now have one end in common. The switches of the arms B2 and B3 and of the additional arm B4 of the second inverter B are controlled so as to cause currents i2 and i3 to flow through the good windings R2 and R3, the current i2 and i3 being at a phase offset $\pi/3$. Under such circumstances, the sum of the currents i2 and i3 is not constantly zero. Nevertheless, the current residue I=i2+i3 is collected at the common point N and can pass via the bridge 7 to return to the second inverter B. This enables the rotary machine of the actuator to be controlled with the help of a single inverter. Here likewise, the torque developed is constant and is equal to 57% of the nominal torque. However, at constant voltage U2, the speed of rotation is halved. In order to return to the nominal speed of rotation, it is appropriate to increase the voltage U2 accordingly.

Without the additional arms A4 and B4, and without the bridge 7, it would not be possible to power the good windings R2 and R3 with currents at a phase offset of $\pi/3$. It would be necessary to ensure that the sum of the currents i2 and i3 is zero since there would be no way of passing the current residue. It would therefore be necessary to power the windings with currents i2 and i3 at a phase offset of $\pi$, thereby leading to torque with a high degree of ripple, which can be harmful in certain applications.

The presence of the additional arms A4 and B4 connected together by a bridge thus makes fault mode operation possible at constant torque, even in the event of one of the windings becoming disconnected.

The power supply architecture shown is thus capable of withstanding the failure of one of the switches in the inverter arms, and is also capable of withstanding the disconnection one of the windings of the rotary machine.

The invention is not limited to the above description, but on the contrary covers any variant coming within the ambit defined by the claims.

In particular, the invention is not limited to powering an electromechanical actuator that includes a three-phase rotary machine, but it applies to a polyphase machine that may have more than three phases.

In addition, although the invention is described with reference to an electromechanical actuator fitted with a rotary electric motor, also referred to as a rotary machine, the invention also applies to powering actuators that have linear motors.

What is claimed is:

1. A power supply having two inverters (A, B) in series for powering an electromechanical actuator having an electric motor including a plurality of windings (R1, R2, R3) forming phases, each inverter being connected to its own ground (50; 51) and having a voltage source (U1; U2) having as many arms (A1, A2, A3; B1, B2, B3) connected thereacross as there are windings to be powered, each arm including two controlled switches (5, 6) connected in series, with a point therebetween being provided for connection to one end of one of the windings, wherein each inverter includes an additional arm (A4; B4) having two controlled switches, the two additional arms being interconnected by a bridge (7) that is connected to each of the additional arms at a point that is situated between the switches.

2. A method of using a power supply having two inverters (A, B) in series for powering an electromechanical actuator having an electric motor including a plurality of windings (R1, R2, R3) forming phases, each inverter being connected to its own ground (50; 51) and having a voltage source (U1; U2) having as many arms (A1, A2, A3; B1, B2, B3) connected thereacross as there are windings to be powered, each arm including two controlled switches (5, 6) connected in series, with a point therebetween being provided for connection to one end of one of the windings, each inverter including an additional arm (A4; B4) having two controlled switches, the two additional arms being interconnected by a bridge (7) that is connected to each of the additional arms at a point that is situated between the switches; the method including the step of controlling the switches of one of the inverters in such a manner as to create a common point (N) between the bridge (7) and at least two windings (R1; R2) in one of the inverters.

* * * * *